(12) United States Patent
Kim et al.

(10) Patent No.: US 8,751,834 B2
(45) Date of Patent: Jun. 10, 2014

(54) METHOD OF CONTROLLING A BROADCASTING RECEIVER AND BROADCASTING RECEIVER ENABLING THE METHOD

(76) Inventors: Kyung Min Kim, Gumi-si (KR); Tae Hwa Lee, Gumi-si (KR)

( * ) Notice: Subject to any disclaimer, the term of this patent is extended or adjusted under 35 U.S.C. 154(b) by 396 days.

(21) Appl. No.: 13/143,787

(22) PCT Filed: Apr. 20, 2009

(86) PCT No.: PCT/KR2009/002035
§ 371 (c)(1),
(2), (4) Date: Jul. 8, 2011

(87) PCT Pub. No.: WO2010/079866
PCT Pub. Date: Jul. 15, 2010

(65) Prior Publication Data
US 2011/0285919 A1     Nov. 24, 2011

(51) Int. Cl.
*G06F 1/00* (2006.01)
*H04N 5/63* (2006.01)
(52) U.S. Cl.
CPC ..................................... *H04N 5/63* (2013.01)
USPC .......................................................... 713/300

(58) Field of Classification Search
USPC .......................................................... 713/300
See application file for complete search history.

(56) References Cited

U.S. PATENT DOCUMENTS

| 5,953,080 A * | 9/1999 | Stephens et al. ............... 348/730 |
| 2006/0066757 A1* | 3/2006 | Numata et al. ................ 348/730 |
| 2009/0195702 A1* | 8/2009 | Eshleman ..................... 348/730 |

FOREIGN PATENT DOCUMENTS

| JP | 2002-354374 | 12/2002 |
| KR | 2000-0021584 | 4/2000 |

OTHER PUBLICATIONS

International Search Report issued in PCT Application No. PCT/KR2009/002035 dated Aug. 23, 2010.

\* cited by examiner

*Primary Examiner* — Kim Huynh
*Assistant Examiner* — Alyaa T Mazyad
(74) *Attorney, Agent, or Firm* — KED & Associates, LLP (57) ABSTRACT

The present invention relates to a control method of a broadcasting receiver and a broadcasting receiver adapting the control method. More specifically, the present invention relates to a control method of a broadcasting receiver capable of switching off a power key in a state of display means standing by and switching on the power key in case that a power-key-on is inputted, to improve user convenience.

10 Claims, 6 Drawing Sheets

METHOD OF CONTROLLING A BROADCASTING RECEIVER AND BROADCASTING RECEIVER ENABLING THE METHOD

TECHNICAL FIELD

The present invention relates to a control method of a broadcasting receiver and a broadcasting receiver adapting the control method. More specifically, the present invention relates to More particularly, the present invention relates to a control method of a broadcasting receiver capable of switching off a power key in a state of display means standing by and switching on the power key in case that a power-key-on is inputted, to improve user convenience.

BACKGROUND ART

In recent, development of media technology enables various functions of broadcasting receivers to enhance user convenience.

One of such the various functions is a last memory function. According to the last memory function, if a key is off, a last state of display means is recorded in a memory and if the key is on again, the display means is controlled to power on in the last state.

That is, a conventional broadcasting receiver adapts the last memory function. A power-key is switched off in a standby state of a display means and if a power-key is on, the standby state is maintained.

Figure 1:
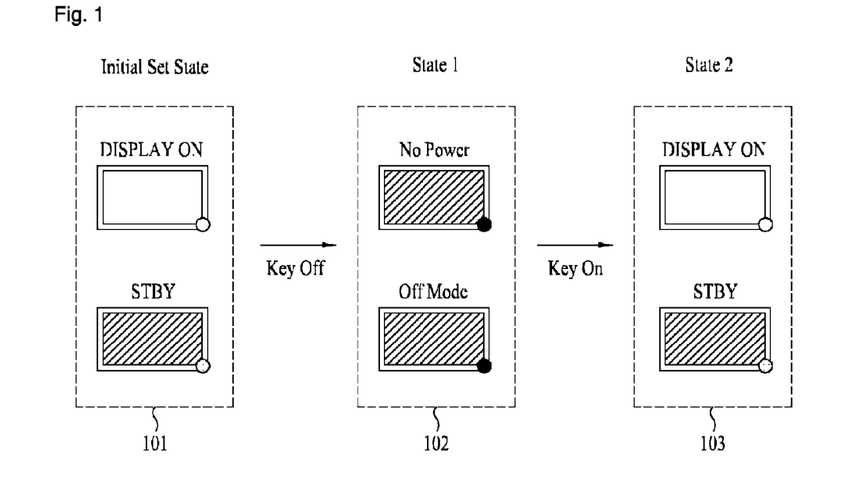
FIG. 1 is a diagram illustrating an embodiment of a conventional broadcasting receiver capable of embodying a last memory function.

FIG. 1 illustrates an embodiment of the last memory function applied to the conventional broadcasting receiver.

In reference to FIG. 1, if a user inputs a power-key off in a standby state of a display means provided in the conventional broadcasting receiver, the display means is in an off mode (102). If the user inputs a power-on key again, the display means is in a standby state 103 again.

Then, the broadcasting receiver stores in the memory that the display means is in the standby state. If the user inputs power-key-on, the broadcasting receiver reads the stored state and operates the display means in a read state.

DISCLOSURE OF INVENTION

Technical Problem

Such the last memory function prevents the display means from being turned on if the electricity is re-supplied after a temporary electricity stoppage, only to enhance user convenience.

When inputting power-on, the user usually desires to switch on a screen of the display means. However, the conventional display means would maintains the standby state because of the last memory function such that the screen is not switched on inconveniently.

Technical Solution

To solve the problems, an object of the present invention is to provide a control method of a broadcasting receiver capable of maintaining the last memory function if the AC-power-key or remote-controller-power-key is on and off, with the display means being powered on with the power-key-on input providing for a temporary stoppage of electricity, without an auxiliary signal line or communication module.

To achieve these objects and other advantages and in accordance with the purpose of the invention, as embodied and broadly described herein, a control method of a broadcasting receiver includes receiving a power-key-on input from a user; generating a power-on pulse and outputting the power-on-pulse to an IR (Infrared) board by a microcomputer if a state of a key-in signal inputted in a microcomputer of a power supply unit is changed according to the power-key-on input; and receiving the output power-on pulse and controlling a display means to power on by the IR board.

In another aspect of the present invention, a control method of a broadcasting receiver includes receiving a power-key-on input from a user; outputting a standby driving voltage to a microcomputer of a last memory module according to the power-key-on input, if a state of a key-in signal inputted in a microcomputer of a power supply unit according to the power-key-on input is changed; outputting an AC (Alternating Current) detect signal to the microcomputer of the last memory module in a predetermined time period after outputting the standby driving voltage; and controlling a display means to power on by the microcomputer of the last memory module, if a time interval between the output of the standby driving voltage and the output of the AC detect signal is a predetermined value or more.

In a further aspect of the present invention, a broadcasting receiver includes a user interface receiving a power-key-on input from a user; a microcomputer generating and outputting a power-on pulse to an IR board, if a state of a key-in signal is changed according to the power-key-on input; and an IR board receiving the output power-on pulse to power on the display means.

In a still further aspect of the present invention, a broadcasting receiver includes a user interface receiving a power-key-on input from a user; a power supply unit outputting a standby driving voltage to a microcomputer of a last memory module, if a state of a key-in signal inputted according to the power-key-on input is changed, and outputting an AC detect signal to the microcomputer of a last memory module in a pre-determined time period after outputting the standby driving voltage; and a last memory module powering on a display means, if a time interval between the output of the standby driving voltage and the output of the AC detect signal is a predetermined value or more.

Advantageous Effects

The present invention has following advantageous effects.

Providing for a temporary stoppage of electricity, the broadcasting receiver according to the present invention may maintain the last memory function if the AC-power-key or remote-controller-power-key is on and off, with the display means being powered on with the power-key-on input. Because of that, user convenience may be enhanced.

Furthermore, according to the present invention, if a user inputs a power-key-on after the display means being off in a standby state, a microcomputer of a power supply unit generates a power-on signal and transmits the power-on signal to an IR board. As a result, if the user inputs the power-key-on, the display means may be on, separate from the last memory function and thus user convenience may be enhanced.

A still further, if the user inputs the power-key-on after the display means is power-key off in the standby state, the display means may be on by using only a time interval between output of a standby driving voltage and output of an output of an AC detect signal. As a result, if the user inputs the power-key on, the display means may be on.

A still further, the present invention may solve the disadvantage of the conventional broadcasting receiver that the display means fails to be on, maintaining a standby state because of the last memory function.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

Next, in reference to the attached drawings, a control method of a broadcasting receiver and a broadcasting receiver adapting the method will be described.

Figure 2:
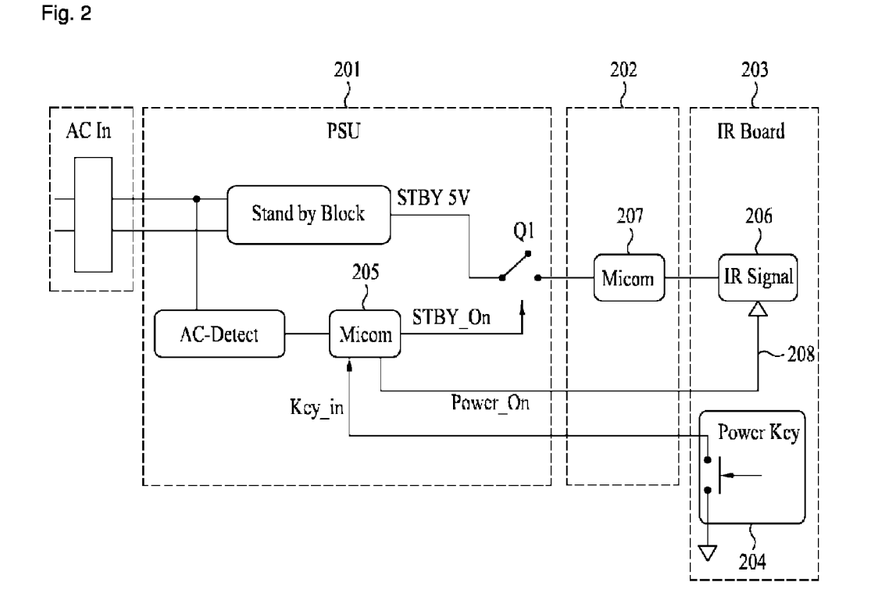
FIG. 2 is a block view illustrating a broadcasting receiver according to an exemplary embodiment of the present invention.

FIG. 2 is a block view illustrating a configuration of a broadcasting receiver according to an exemplary embodiment of the present invention.

In reference to FIG. 2, the broadcasting receiver according to the exemplary embodiment of the present invention includes a power supply unit 291, a last memory module (referenced to as chassis in the drawings) 202, an infrared board (hereinafter, IR broad) 203 and a user interface (not shown).

The user interface (not shown) receives a power-key off in a standby state of a display means.

Figure 3:
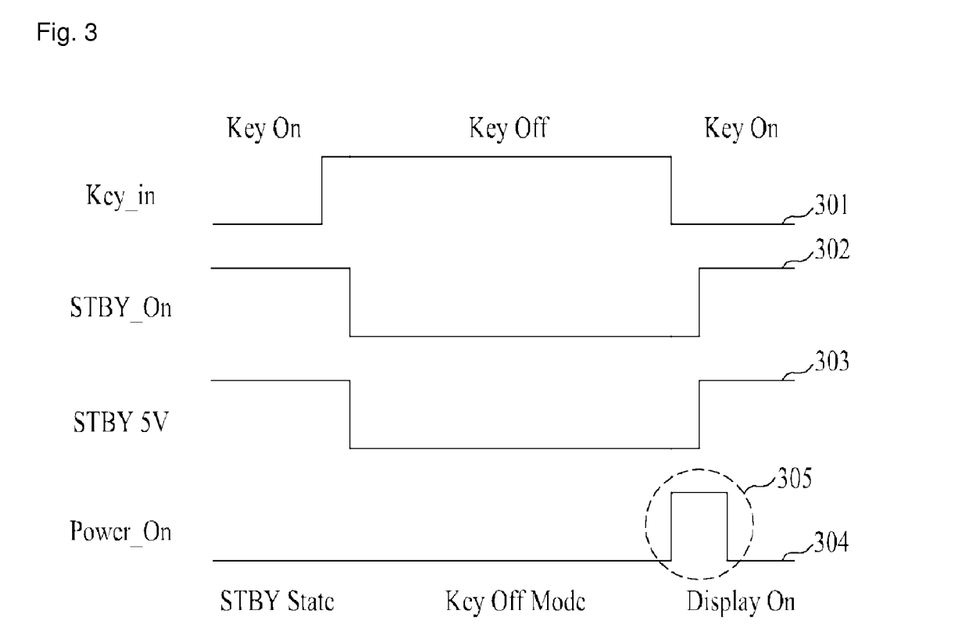
FIG. 3 is a diagram illustrating an embodiment of a key-in signal and power-on pulse according to the exemplary embodiment of the present invention.

FIG. 3 illustrates an embodiment of a key-in signal and power-on pulse according to the exemplary embodiment.

If the power-key off is received from a user, a state of a key-in signal inputted in a microcomputer 205 of the power supply unit 201 is changed from low to high as shown in a numeral reference 301 and a state of a standby-on signal is changed from high to low as shown in a numeral reference 302. Also, a state of a standby driving voltage (referenced to as STBY 5V) supplied to the last memory module 202 is changed to low as shown in a numeral reference 303.

The last memory module 202 stores information on the standby state in a memory and the display means comes into an off-mode.

Hence, if the user inputs a power-key-on, the user interface (not shown) receives a power-key-in input and a state of a key-in signal inputted in the microcomputer 205 of the power supply unit 201 is changed.

For example, the state of the key-in signal is low during the standby state of the display means as shown in the numeral reference 301 of FIG. 3. At this time, if the power-key-off is received, the state of the key-in signal is high and if the power-key-on is re-inputted by the user, it is changed from low to low.

Here, the state of the standby-on signal outputted from the microcomputer 205 is changed from low to high and the state of the standby driving voltage is changed from low to high.

If the state of the key-in signal inputted in the microcomputer 205 of the power supply unit 201 is changed according to the power-key-on input, the microcomputer 205 generates a power-on pulse and outputs the power-on pulse to the IR board.

The power-on pulse generated by the microcomputer 205 may be a pulse wave as shown in a number reference 304 of FIG. 3.

At this time, the power-on pulse may be outputted to the IR board 200 via a separate port 208.

Once the IR board 206 receives the outputted power-on pulse, the display means is controlled to power on regardless of the last memory function.

In the meanwhile, if the broadcasting receiver of FIG. 2 receives a power-key-on command of a remote controller, a separate power-on pulse is not generated. Instead, after the state information stored in the memory of the last memory module 202 is determined, the display means is operated according to the result of determination of the state information stored in the memory.

Also, if an AC-power-key-on command is inputted from the user, the state information stored in the memory of the chasses 202 is determined and then the display means is operated according to the result of the determination of the state information stored in the memory.

Here, the AC-power-key inputted by the user or the power-key received from the remote controller of the present invention includes all keys applicable to the last memory function, different from a power-key.

As a result, if the user inputs the power-key-on after a power-key is off in the standby state of the display means, the microcomputer of the power supply unit generates the power-on signal and transmits it to the IR board. Because of that, even in case that the user inputs the power-key-on, the display means is controlled to power on, separate from the last memory function and user convenience may be enhanced effectively.

That is, the present invention may solve the disadvantage of the conventional broadcasting receiver that the display means fails to be powered on, maintaining a standby state because of the last memory function.

In addition, providing for a temporary stoppage of electricity, the broadcasting receiver according to the present invention may maintain the last memory function if the AC-power-key inputted by the user or power-key received from the remote controller is on and off, with the display means being powered on with the power-key-on input. Because of that, the present invention may have an effect of enhanced user convenience.

Figure 4:
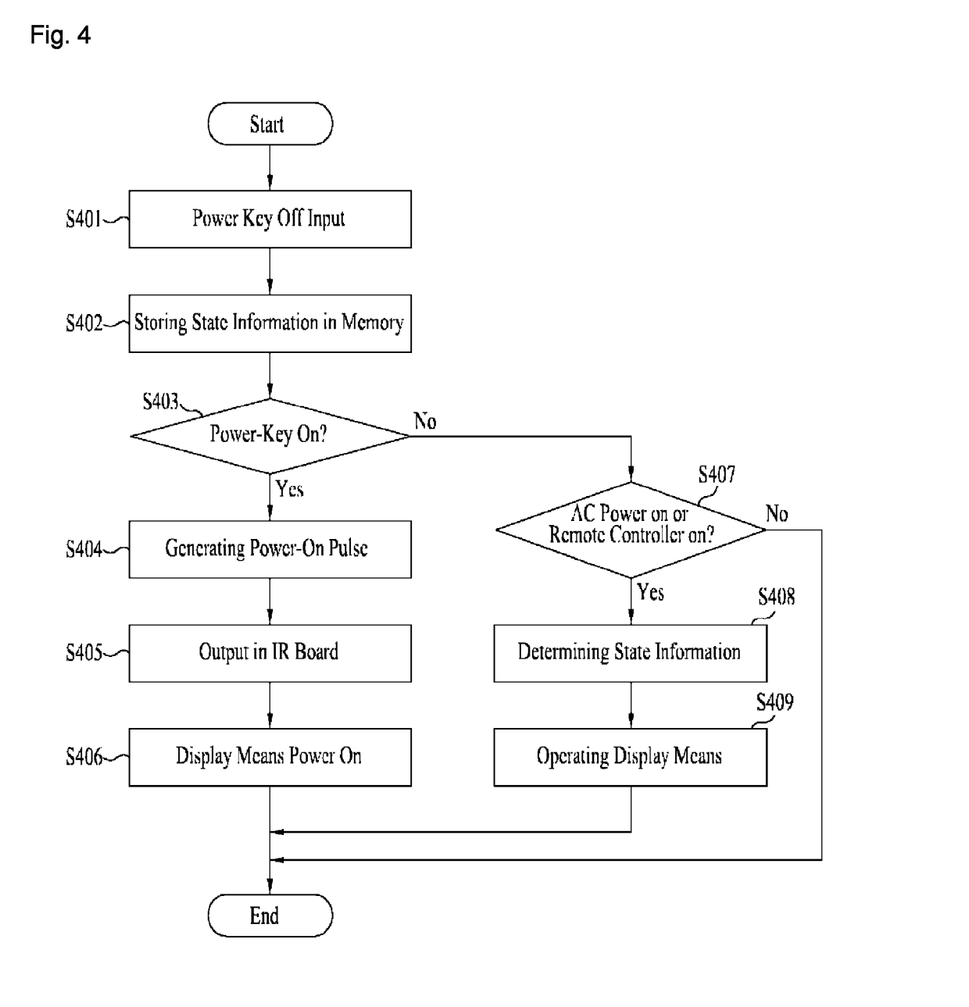
FIG. 4 is a flow chart illustrating an operational process of the broadcasting receiver according to an exemplary embodiment of the present invention.

FIG. 4 is a flow chart illustrating an operational process of the broadcasting receiver according to an exemplary embodiment of the present invention.

In reference to FIG. 4, the broadcasting receiver receives a power-key-off in a standby state of the display means (S401).

The broadcasting receiver having received the power-key-off stores the state information of the display means stored in the last memory module (S402).

Hence, the broadcasting receiver determines whether a power-key-on is inputted by the user (S403).

If the state of key-in signal inputted in the microcomputer of the power supply unit is changed after the user inputted the power-key-on based on the result of the determination in the step (S403), the microcomputer of the power supply unit generates a power-on pulse (S404) and it outputs the power-on pulse to the IR board (S405).

The broadcasting receiver receives the power-on pulse outputted from the IR board and it controls display means to power on (S406).

At this time, the broadcasting receiver controls the display means to power on regardless of the operation of the last memory module and user convenience may be improved as mentioned above.

If there is the AC-power-key-on inputted by the user or power-key-on received from the remote controller, not the power-key-on, based on the result of the determination in the step (S407), the broadcasting receiver determines the state information stored in the memory of the last memory module (S408) and it operates the display means according to the result of the determination of the state information (S409).

On the other hand, the display means may be on regardless of the operation of the last memory module according to another embodiment, without generating a separate power-on pulse. Next, it will be described in detail.

Figure 5:
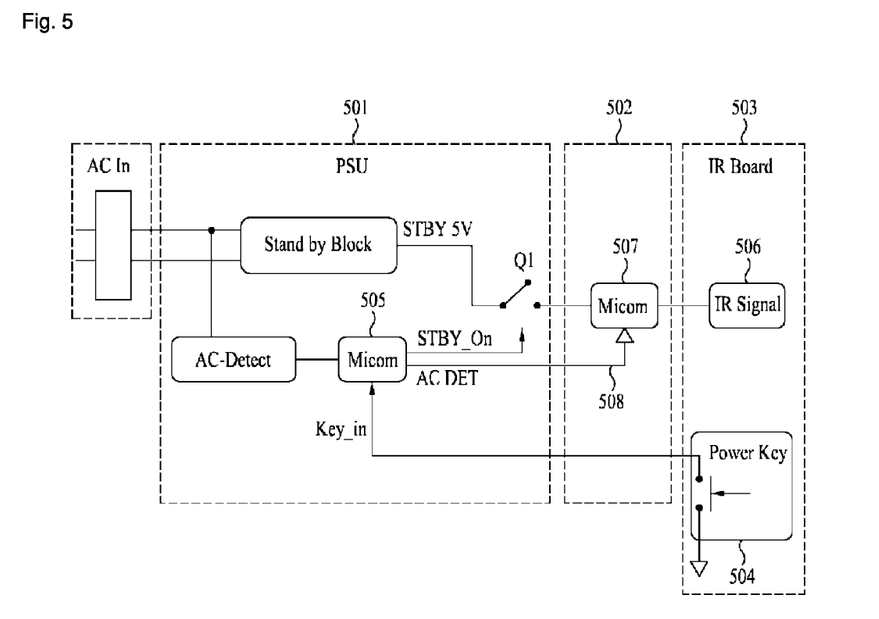
FIG. 5 is a block view illustrating a broadcasting receiver according to another embodiment of the present invention.

FIG. 5 is a block view illustrating a configuration of a broadcasting receiver according to another embodiment of the present invention.

In reference to FIG. 5, a broadcasting receiver according to another embodiment of the present invention includes a power supply unit 591, a last memory module 502, an infrared board (hereinafter, IR board) 503, a user interface (not shown).

The user interface (not shown) receives a power-key-off in a standby state of the display means.

Figure 6:
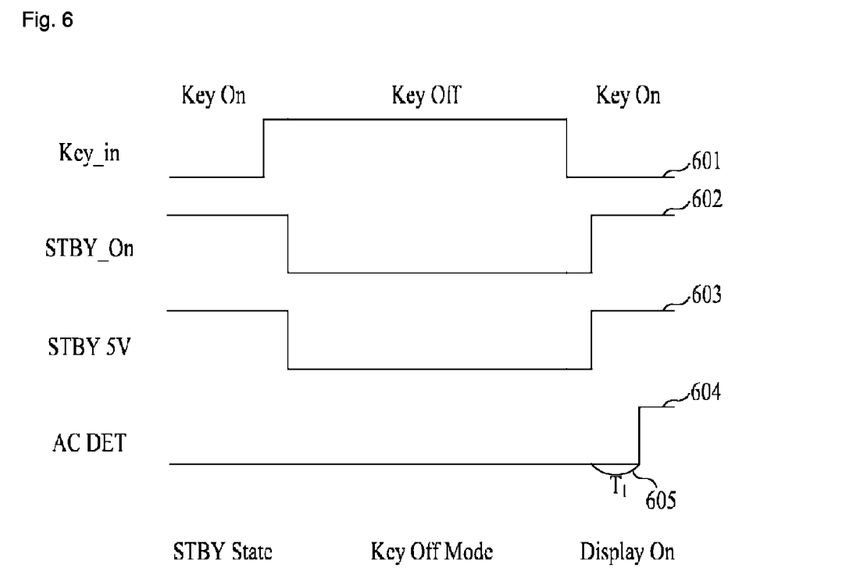
FIG. 6 is a diagram illustrating an embodiment of a key-in signal, standby-on signal, standby driving voltage and AC detect signal according to the present invention.

FIG. 6 is a diagram illustrating an embodiment of a key-in signal, standby-on signal, standby driving voltage and alternating current (hereinafter, AC) detect signal according to the present invention.

If a power-key-off input is received, a state of a key-in signal inputted in a microcomputer 505 of the power supply unit 501 is changed from low to high as shown in a numeral reference 601 and a state of a standby-on signal is changed from high to low as shown in a numeral reference 602. Also, a state of a standby driving voltage referenced to as STBY 5V in FIG. 5 supplied to the last memory module 502 is changed to low as shown in a numeral reference 603.

The last memory module 502 stores information on the standby state in a memory and the display means comes into an off-mode.

Hence, once the user inputs a power-key-on, the user interface (not shown) receives the power-key-on input and the state of the key-in signal inputted in the microcomputer 505 of the power supply unit 501 is changed.

For example, the key-in signal is in a low state as shown in the numeral reference 601 of FIG. 6 during the standby of the display means. At this time, if receiving the power-key-off, the state of the key-in signal is changed to high and if the power-key-on is inputted by the user again, it is changed to low from high.

Here, the standby-on signal outputted from the microcomputer 505 is also changed from low to high as shown in the numeral reference 602 and the state of the standby driving voltage, that is, STBY 5V is also changed from low to high as shown in the numeral reference 603.

If the state of the key-in signal inputted in the microcomputer 505 of the power supply unit 501 is changed according to the power-key-on input, the microcomputer 505 outputs an AC detect signal to a microcomputer 507 of the last memory module 502 in a predetermined time period after outputting the standby driving voltage.

That is, in a predetermined time period (T1) passes after the standby driving voltage 602 is outputted in a high state, the microcomputer 505 outputs the AC detect signal in a high state as shown in the numeral reference 604.

At this time, the predetermined time period may be preset as various values. For example, the Ac detect signal may be outputted in a high state in 800 msec after outputting the STBY 5V.

The microcomputer 507 of the last memory module 502 powers on the display means if a time interval between the output of the STBY 5V and the output of the AC detect signal is a predetermined value or more.

For example, if the AC detect signal is outputted in a high state in a 800 msec or more after outputting STBY 5V, the microcomputer 507 of the last memory module 502 recognizes the output of the AC detect signal in a high state and it powers on the display means.

Here, the microcomputer of the last memory module 502 may controls the display means to power on by changing the state information of the display means stored in the memory to a display-on or by controlling the IR board.

When receiving a power-key-on command from the remote controller, the broadcasting receiver of FIG. 5 determines the state information stored in the memory of the last memory module 502 and it operates the display means according to the result of the determination of the state information.

Even when receiving an AC-power-key-on command inputted by the user, the broadcasting receiver determines the state information stored in the memory of the last memory module 502 and it operates the display means according to the result of the determination of the state information.

At this time, the AC power key or power key of the remote controller according to the present invention may include all keys applicable to the last memory function, separate from the power-key.

According to the present invention, if the user inputs a power-key-on after the display means is powered off in the standby state, the display means is powered on, using the time interval between the output of the standby driving voltage and the output of the AC detect signal in the last memory module. As a result, without any auxiliary lines, if the user inputs the power-key-on, the display means may be powered on, separate from the last memory function. Thus, the present invention has an advantage of improved user convenience.

That is, the present invention may solve the disadvantage of the conventional broadcasting receiver that the display means fails to be on, maintaining a standby state because of the last memory function.

In addition, providing for a temporary stoppage of electricity, the broadcasting receiver according to the present invention may maintain the last memory function if there is the AC-power-key-on/off inputted by the user or the power-key-on/off received from the remote controller, with the display means being powered on with the power-key-on input. Because of that, the present invention may have an effect of enhanced user convenience.

Figure 7:
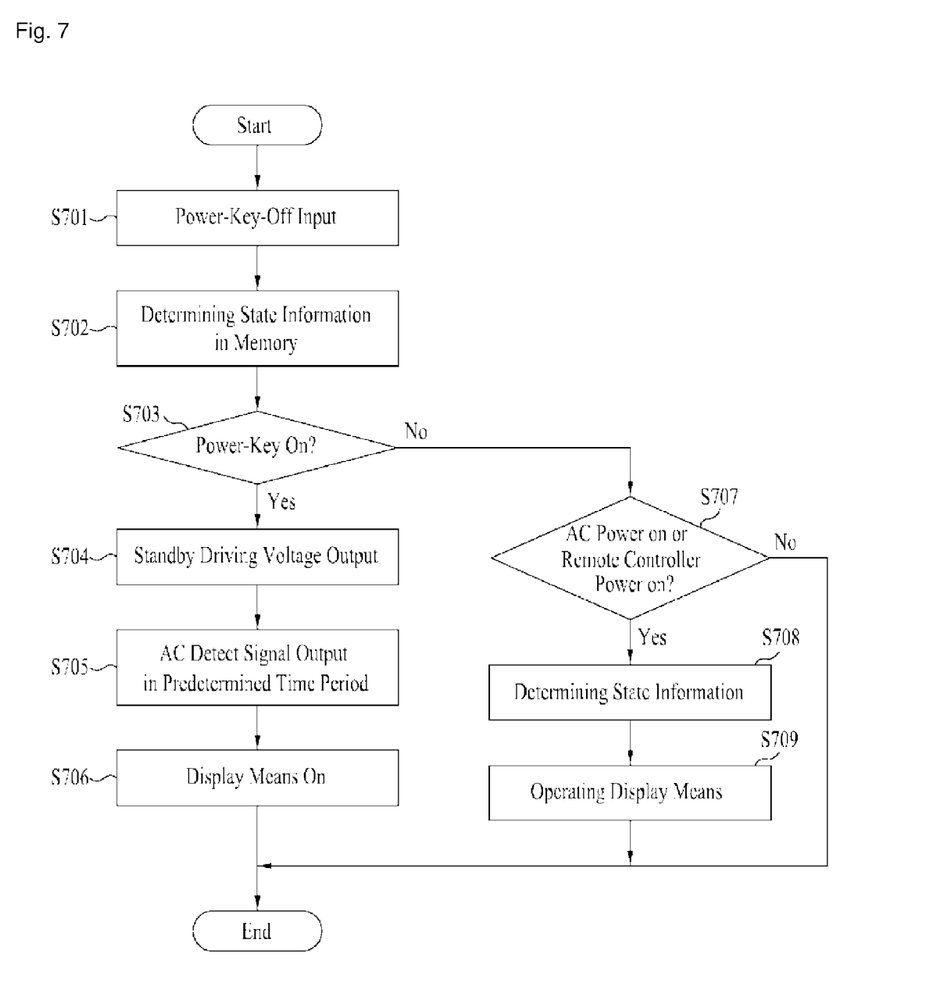
FIG. 7 is a flow chart illustrating an operational process of the broadcasting receiver according to another embodiment.

FIG. 7 is a flow chart illustrating an operational process of the broadcasting receiver according to another embodiment of the present invention.

In reference to FIG. 7, the broadcasting receiver receives a power-key-off in a standby state of the display means (S701).

The broadcasting receiver having received the power-key-off stores the state information of the display means stored in the last memory module (S702).

Hence, the broadcasting receiver determines whether a power-key-on is inputted by the user (S703).

If the state of key-in signal inputted in the microcomputer of the power supply unit is changed after receiving the power-key-on input based on the result of the determination in the step (S703), the power supply unit of the broadcasting receiver outputs the standby driving voltage to the last memory module (S704).

In the predetermined time period after outputting the standby driving voltage, the power supply unit outputs the AC detect signal in a high state to the last memory module (S705).

The microcomputer of the last memory module controls the display means to power on if the time internal between the output of the standby driving voltage and the output of the AC detect signal is a predetermined value or more (S706).

At this time, the microcomputer of the last memory module may controls the display means to power on by changing the state information stored in the memory to the display-on or by controlling the IR board, as mentioned above.

In the meanwhile, if the power-key of the AC power key or the power-key of the remote controller is on based on the result of the determination in the step (S707), without the power-key being on, the broadcasting receiver determines the state information stored in the memory of the last memory module (S708) and it may operates the display means according to the result of the determination of the state information (S709).

Figure 8:
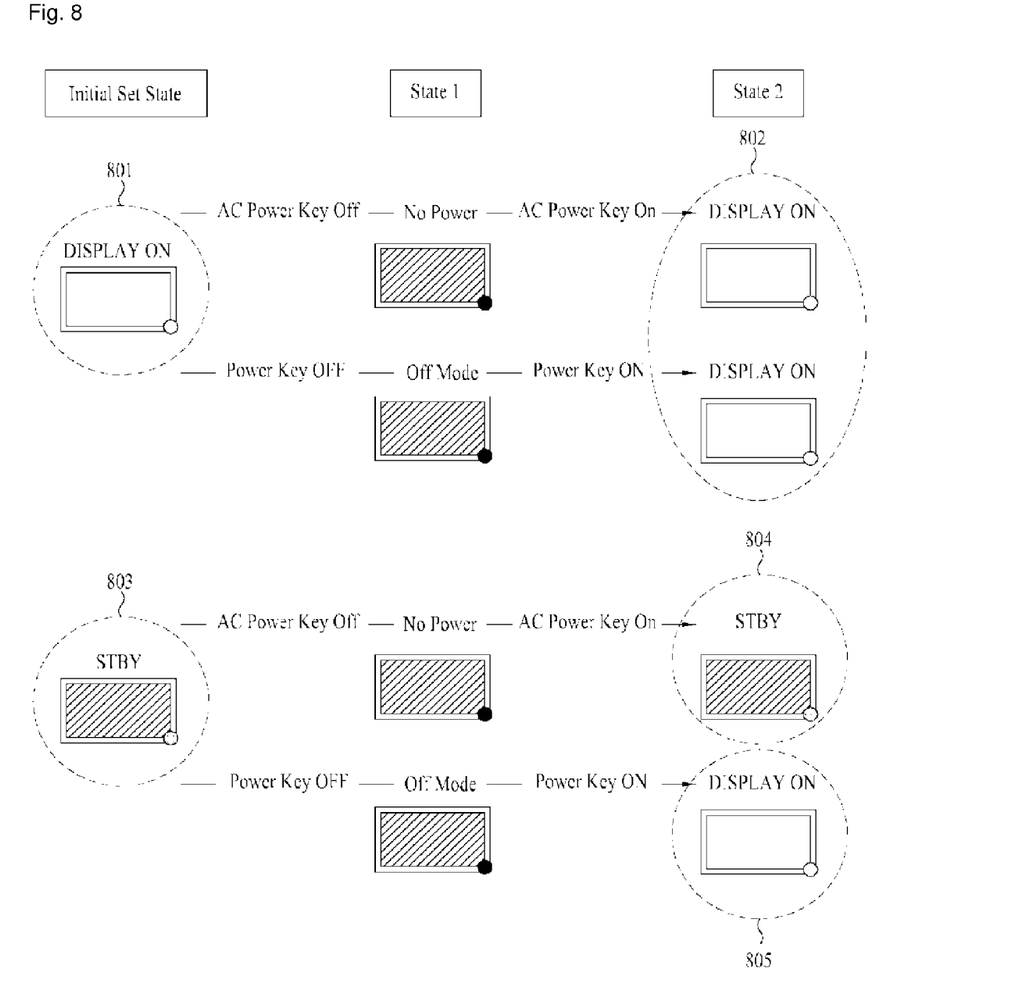
FIG. 8 is a diagram comparing a power-key operation with an AC-power-key according to the exemplary embodiment of the present invention.

FIG. 8 is a diagram illustrating comparison between the output of the power key and the output of the AC power key according to the embodiment of the present invention.

In reference to FIG. 8, if the AC power key or the power key is off and then on again in a state of the display means being powered on (S801), the display means is displayed on again by the last memory function (S802).

Even if the AC power key is off and then on again in the standby state (S803) of the display means, the display means is in the standby state by the last memory function (S804).

However, if the display means of the broadcasting receiver according to the present invention is power-key off and then power-key on again in the standby state (S803), the display means is powered on (S805) by the generation of the power-on pulse or the time interval of the output between the standby driving voltage and the AC detect signal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention has an industrial applicability as follows.

Providing for a temporary stoppage of electricity, the broadcasting receiver according to the embodiments of the present invention may maintain the last memory function if the AC-power-key or remote-control-power-key is on and off, with the display means being powered on with the power-key-on input.

The invention claimed is:

1. A control method of a broadcasting receiver comprising:
   receiving a power-key-on input from a user;
   outputting a standby driving voltage to a microcomputer of a last memory module according to the power-key-on input, if a state of a key-in signal inputted in a microcomputer of a power supply unit according to the power-key-on input is changed;
   outputting an AC (Alternating Current) detect signal to the microcomputer of the last memory module in a predetermined time period after outputting the standby driving voltage; and
   controlling a display means to power on by the microcomputer of the last memory module, if a time interval between the output of the standby driving voltage and the output of the AC detect signal is a predetermined value or more.

2. The control method of claim 1, further comprising:
   receiving a power-key-off input in a standby state of the display means; and
   storing information on the standby state in a memory.

3. The control method of claim 2, further comprising:
   determining the state information stored in the memory if a power-on command is received from a remote controller; and
   operating the display means according to the result of the determination of the state information stored in the memory.

4. The control method of claim 2, further comprising:
   determining a final information state stored in the memory, if an AC-power-key-on command is inputted from the user; and
   operating the display means according to the result of the determination of the state information stored in the memory.

5. The control method of claim 1, wherein the controlling step comprises:
   controlling the display means to power on by changing the state information of the display means stored in the memory to a display-on or by controlling a IR board, if the time interval between the output of the standby driving voltage and the output of the AC detect signal is a predetermined value or more.

6. A broadcasting receiver comprising:
   a user interface receiving a power-key-on input from a user;
   a power supply unit outputting a standby driving voltage to a microcomputer of a last memory module, if a state of a key-in signal inputted according to the power-key-on input is changed, and outputting an AC detect signal to the microcomputer of a last memory module in a predetermined time period after outputting the standby driving voltage; and
   a last memory module powering on a display means, if a time interval between the output of the standby driving voltage and the output of the AC detect signal is a predetermined value or more.

7. The broadcasting receiver of claim 6, wherein the last memory module receives a power-key-off input in a standby state of the display means and stores information on the standby state in a memory.

8. The broadcasting receiver of claim 7, wherein the last memory module determines the state information stored in the memory, if receiving a power-key-on command from a remote controller, and operating the display means according to the result of the determination of the state information stored in the memory.

9. The broadcasting receiver of claim 7, wherein the last memory module determines the state information stored in the memory, if an AC (Alternating Current)-power-key-on command is inputted, and operating the display means according to the result of the determination of the state information stored in the memory.

10. The broadcasting receiver of claim 6, wherein the microcomputer of the last memory module controls the display means to power on by changing the state information of the display means stored in the memory into a display-on or by controlling the IR board, if a time interval between the output of the standby driving voltage and the output of the AC detect signal is a predetermined value or more.

* * * * *